(12) United States Patent
Hrachova et al.

(10) Patent No.: US 11,603,453 B2
(45) Date of Patent: Mar. 14, 2023

(54) COMPOSITION COMPRISING HETEROPHASIC PROPYLENE COPOLYMER

(71) Applicant: SABIC GLOBAL TECHNOLOGIES B.V., Bergen Op Zoom (NL)

(72) Inventors: Jana Hrachova, Geleen (NL); Pieter Valkier, Geleen (NL); Benoit Therese Philippe Lecouvet, Geleen (NL)

(73) Assignee: SABIC GLOBAL TECHNOLOGIES B.V, Bergen Op Zoom (NL)

( * ) Notice: Subject to any disclaimer, the term of this patent is extended or adjusted under 35 U.S.C. 154(b) by 148 days.

(21) Appl. No.: 16/467,708

(22) PCT Filed: Dec. 12, 2017

(86) PCT No.: PCT/EP2017/082460
§ 371 (c)(1),
(2) Date: Jun. 7, 2019

(87) PCT Pub. No.: WO2018/108932
PCT Pub. Date: Jun. 21, 2018

(65) Prior Publication Data
US 2020/0002518 A1 Jan. 2, 2020

Related U.S. Application Data

(63) Continuation-in-part of application No. PCT/EP2017/082460, filed on Dec. 12, 2017.

(30) Foreign Application Priority Data

Dec. 12, 2016 (EP) ..................................... 16203446

(51) Int. Cl.
| | |
|---|---|
| *C08L 23/12* | (2006.01) |
| *B29B 7/90* | (2006.01) |
| *B29C 45/00* | (2006.01) |
| *B29K 23/00* | (2006.01) |
| *B29K 509/08* | (2006.01) |

(52) U.S. Cl.
CPC ............... *C08L 23/12* (2013.01); *B29B 7/90* (2013.01); *B29C 45/0001* (2013.01); *B29K 2023/12* (2013.01); *B29K 2509/08* (2013.01); *C08L 2205/025* (2013.01); *C08L 2205/03* (2013.01); *C08L 2205/035* (2013.01); *C08L 2205/14* (2013.01); *C08L 2207/02* (2013.01); *C08L 2310/00* (2013.01)

(58) Field of Classification Search
CPC ............... C08L 23/12; C08L 2205/025; C08L 2205/03; C08L 2205/14; C08L 2207/02; C08L 2310/00; C08L 2205/035; B29B 7/90; B29C 45/0001; B29K 2023/12; B29K 2509/08
USPC ....................................................... 524/506
See application file for complete search history.

(56) References Cited

U.S. PATENT DOCUMENTS

| | | | |
|---|---|---|---|
| 4,399,054 A | 8/1983 | Ferraris et al. | |
| 4,472,524 A | 9/1984 | Albizzati | |
| 4,771,024 A | 9/1988 | Nestlerode et al. | |
| 4,866,022 A | 9/1989 | Arzoumanidis et al. | |
| 5,093,415 A | 3/1992 | Brady, III et al. | |
| 6,395,670 B1 | 5/2002 | Morini et al. | |
| 6,825,146 B2 | 11/2004 | Kilty et al. | |
| 7,476,710 B2* | 1/2009 | Mehta ..................... C08L 23/10 525/191 |
| 2010/0234507 A1* | 9/2010 | Pezzutti ................ C08F 210/06 524/396 |
| 2014/0288225 A1* | 9/2014 | Shipley ................ C08L 53/025 524/451 |
| 2014/0378601 A1 | 12/2014 | Jin et al. | |
| 2016/0046799 A1 | 2/2016 | Van Riel et al. | |

FOREIGN PATENT DOCUMENTS

| | | |
|---|---|---|
| EP | 0019330 A | 11/1980 |
| EP | 398698 A2 | 11/1990 |
| EP | 0695781 A1 | 2/1996 |
| EP | 0714923 A1 | 6/1996 |
| EP | 1273595 A1 | 1/2003 |
| EP | 1838741 B1 | 4/2011 |
| WO | 9632426 A1 | 10/1996 |
| WO | 03066828 A2 | 8/2003 |
| WO | 2006010414 A1 | 2/2006 |
| WO | 2006056338 A1 | 6/2006 |
| WO | 2007134851 A1 | 11/2007 |
| WO | 2008020925 A1 | 2/2008 |
| WO | 2015028955 A1 | 3/2015 |
| WO | 2018108929 A1 | 12/2017 |
| WO | 2018108927 A1 | 6/2018 |
| WO | 2018108928 A1 | 6/2018 |
| WO | 2018108935 A1 | 6/2018 |
| WO | 2018108936 A1 | 6/2018 |

OTHER PUBLICATIONS

Butts et al., "Silicones—T Resins," Enc. Polym. Sci. Tech, vol. 11, John Wiley & Sons, pp. 804-805. (Year: 2003).*

(Continued)

*Primary Examiner* — Josephine L Chang
(74) *Attorney, Agent, or Firm* — Cantor Colburn LLP

(57) ABSTRACT

The invention relates to a composition comprising a heterophasic propylene copolymer (A), glass fibers (B) and an ethylene-α-olefin copolymer (C), wherein the α-olefin is chosen from the group of α-olefins having 3 to 12 carbon atoms. The heterophasic propylene copolymer (A) consists of (a) a propylene-based matrix, consisting of a propylene homopolymer and/or a propylene-α-olefin copolymer consisting of at least 85 wt % of propylene and at most 15 wt % of α-olefin, and (b) a dispersed ethylene-α-olefin copolymer, wherein the heterophasic propylene copolymer has a flexural modulus of less than 1000 MPa, wherein the dispersed ethylene α-olefin copolymer (b) has an average rubber particle size $d_{50}$ of at most 1.15 μm as determined by scanning electron microscopy, and wherein the total amount of (b) the dispersed ethylene-α-olefin copolymer in the heterophasic propylene copolymer (A) and the ethylene-α-olefin copolymer (C) is 30 to 60 wt % based on the total composition.

15 Claims, No Drawings

(56) References Cited

OTHER PUBLICATIONS

Hirano et al. "Morphological Analysis of the Tiger Stripe on Injection Molding of Polypropylene/Ethylene-Propylene Rubber/Talc Blends Dependent on Based Polypropylene Design" Journal of Applied Polymer Science, vol. 104, 2007, pp. 192-199.
Hirano et al. "Striped-Pattern Deterioration and Morphological Analysis of Injection Molding Comprising Polypropylene/Ethylene-a-Olefin Rubber Blends. II. Influence of Heating"; Journal of Applied Polymer Science, vol. 108, 2008, pp. 76-84.
International Preliminary Report on Patentability; International Application No. PCT/EP2017/082460; International Filing Date: Dec. 12, 2017; 5 pages.
International Search Report; International Application No. PCT/EP2017/082460; International Filing Date: Dec. 12, 2017; dated Apr. 11, 2018; 4 pages.
Periodic System of the Elements (Handbook of Chemistry and Physics, 70th Edition, CRC Press, 1989-1990 (1 page).
Sahagian et al. "3D particle size distributions from 2D observations: stereology for natural applications"; Journal of Volcanology and Geothermal Research, vol. 84, 1998, pp. 173-196.
Written Opinion; International Application No. PCT/EP2017/082460; International Filing Date: Dec. 12, 2017; dated Apr. 11, 2018; 4 pages.
Ser van der Ven "Polypropylene and Other Polyolefins: Polymerization and Characterization," Studies in Polymer Science, Elsevier (1990) 11 Pages.

* cited by examiner

COMPOSITION COMPRISING HETEROPHASIC PROPYLENE COPOLYMER

CROSS REFERENCE TO RELATED APPLICATIONS

This application is a 371 of International Application No. PCT/EP2017/082460, filed Dec. 12, 2017, which is incorporated by reference in its entirety, and which claims priority to European Application Serial No. 16203446.6, filed Dec. 12, 2016.

The invention relates to a composition comprising a heterophasic propylene copolymer, to a process for obtaining such composition, to the use of such composition and an article comprising such composition. More in particular, the invention relates to a composition which, after moulding, provides a soft touch feel.

For the purpose of this application, "soft touch feel" is a property of the mouldings which can be described as a softness perceived as pleasant on contact of the human hand with the surface of the mouldings. "Soft touch feel" is typically qualitatively determined via a panel, for example composed of five persons of which at least three have to assess the contacted surface as having typical "soft touch feel" in comparison with an internal sample catalogue composed of five different surfaces with and without "soft touch feel".

Soft touch materials have found applications in many industries. For example, soft touch materials can be utilised in automotive interior components such as trim components, grips on steering wheels, and shifters. Electronic industries also utilise soft touch materials on the grips and protective coverings of handheld electronic devices. Other applications can vary, for example soft touch material can be found in tool handles and tooth brushes.

One way to impart a soft touch feel is to use a multistep process applying a secondary layer of functional material on top of a moulded article through over-moulding, painting, or other techniques. Another way to impart a soft touch feel is to provide a polymeric composition, particularly, a polyolefin composition that can exhibit a relatively soft touch feel. Such a composition desirably also has one or more of low gloss, good impact properties, good flexural properties, good tensile properties, good scratch resistance, and practical hardness values.

Thermoplastic polymeric compositions which, after moulding, provide a soft touch feel are known in the art.

WO-A-2015/028955 discloses olefinic compositions that yield articles wherein desirable soft touch feel properties are combined with good mechanical properties. These soft touch compositions comprise, based on the total weight of the composition, 10-40 wt. % of glass fibres, and 50-88 wt. % of a polymer comprising, based on the total weight of the polymer, 44-52 wt. % of a polypropylene homopolymer, 3-30 wt. % of an ethylene-propylene copolymer, and 22-52 wt. % of an ethylene-$C_4$ to $C_8$ α-olefin copolymer.

The inventors found, however, that in particular the optical surface properties of articles made from the olefinic compositions, such as disclosed in WO-A-2015/028955, can be improved. In particular, articles made from the olefinic compositions disclosed in WO-A-2015/028955 suffer from so-called tiger stripes. The term "tiger stripes" as used in this application is meant to refer to matt and gloss variations on the surface of an injection moulded article, which occur because of unstable mould fillings properties of the molten polymer as it is being injected into the mould and formed into the desired shape. Usually these variations can be observed as alternating areas of low and high gloss and/or light or darker colour, wherein the areas usually are substantially perpendicular to the flow direction of an injection moulded article. Tiger stripes may also be referred to as tiger marks or tiger (flow) marking or flow marks. Examples of such appearance and a more scientific discussion on the cause of tiger stripes may be found in Hirano et al., *Journal of Applied Polymer Science* 2007, 104(1), 192-199 and in Hirano et al., *Journal of Applied Polymer Science* 2008, 108(1), 76-84, the contents of which are herewith completely incorporated by reference.

Accordingly, there is a need in the art for thermoplastic compositions having a high flow with which articles can be made using injection moulding that have a soft touch feel. Preferably, these compositions should also maintain and more preferably improve the optical surface properties (e.g. improve tiger stripes performance, that is to reduce tiger stripe visibility).

US2016046799 discloses a polymeric composition comprising a blend of a first polymeric component including a relatively hard thermoplastic, a second polymeric component including a relatively soft thermoplastic, glass fibers and a grafted polypropylene. US2016046799 discloses examples where mechanical properties such as impact strength and optical properties such as gloss are shown. Although US2016046799 mentions that the composition is a soft touch feel polymeric composition, US2016046799 does not include any experiments on soft touch results. US2016046799 further does not include any experiments on tiger stripes.

An objective of the invention is to overcome the above-described and/or other drawbacks in the prior art.

Accordingly, the present invention provides a composition comprising a heterophasic propylene copolymer (A), glass fibers (B) and an ethylene-α-olefin copolymer (C), wherein the α-olefin is chosen from the group of α-olefins having 3 to 12 carbon atoms, wherein the heterophasic propylene copolymer (A) consists of (a) a propylene-based matrix, wherein the propylene-based matrix consists of a propylene homopolymer and/or a propylene-α-olefin copolymer consisting of at least 85 wt % of propylene and at most 15 wt % of α-olefin, based on the total weight of the propylene-based matrix and wherein the propylene-based matrix is present in an amount of 55 to 75 wt % based on the total heterophasic propylene copolymer and (b) a dispersed ethylene-α-olefin copolymer, wherein the dispersed ethylene-α-olefin copolymer is present in an amount of 45 to 25 wt % based on the total heterophasic propylene copolymer and wherein the sum of the total amount of propylene-based matrix and total amount of the dispersed ethylene-α-olefin copolymer in the heterophasic propylene copolymer is 100 wt % based on the heterophasic propylene copolymer, wherein the heterophasic propylene copolymer has a flexural modulus of less than 1000 MPa as determined at 23° C. in the parallel direction according to ASTM D790 Procedure B on a sample of 65×12.7×3.2 mm.

wherein the dispersed ethylene α-olefin copolymer (b) has an average rubber particle size $d_{50}$ of at most 1.15 μm as determined by scanning electron microscopy and wherein the total amount of (b) the dispersed ethylene-α-olefin copolymer in the heterophasic propylene copolymer (A) and the ethylene-α-olefin copolymer (C) is 30 to 60 wt % based on the total composition.

The inventors have surprisingly found that the composition of the invention has a high flow in combination with a good soft touch performance. In addition, the composition of the invention maintains properties and may even improve impact, warpage, tensile strength, gloss and/or tiger stripes performance. This makes the composition of the invention very suitable for (injection molding) applications, for example automotive exterior parts, for example bumpers, body panels, and automotive interior parts, like instrument panels.

WO2015/028955 does not disclose the use of a heterophasic propylene copolymer comprising a dispersed phase having d50 of at most 1.15 μm. The tiger stripe of the composition of WO2015/028955 is not as good as the composition according to the invention.

US2016046799 discloses compositions comprising an impact polypropylene copolymer, glass fibers and an ethylene-octene copolymer, for example in examples 37 and 38. In examples 37 and 38, the impact polypropylene copolymer (PP-D) contains at least 80 wt % of isotactic polypropylene. The amount of the elastomeric copolymer phase in the impact polypropylene copolymer in these examples of US2016046799 is therefore less than 20 wt %. In contrast, the heterophasic propylene copolymer in the composition according to the invention has a higher content of the dispersed ethylene-α-olefin copolymer of 25 to 45 wt %. Further, the impact polypropylene copolymer of examples 37 and 38 (PP-D) has a flexural modulus of about 1450 MPa, which is higher than the flexural modulus of the heterophasic propylene copolymer in the composition according to the invention. The composition of US2016046799, such as in examples 37 and 38, has a relatively low elastomeric content in the impact polypropylene copolymer ("internal rubber") and a relatively high content of the ethylene-octene copolymer ("external rubber"). The tiger stripe performance is worse in such composition compared to a composition having a relatively high "internal rubber" content and a relatively low "external rubber" content.

Preferably, the composition of the invention has a melt flow index as determined according to ISO1133 at 230° C. and 2.16 kg in the range of 8.0 to 20.0 dg/min, for example in the range of 8.5 to 20 dg/min.

Heterophasic Propylene Copolymer (A)

Heterophasic propylene copolymers are generally prepared in one or more reactors, by polymerization of propylene in the presence of a catalyst and subsequent polymerization of a propylene-α-olefin mixture. The resulting polymeric materials are heterophasic, but the specific morphology usually depends on the preparation method and monomer ratios used.

The heterophasic propylene copolymers employed in the process according to present invention can be produced using any conventional technique known to the skilled person, for example multistage process polymerization, such as bulk polymerization, gas phase polymerization, slurry polymerization, solution polymerization or any combinations thereof. Any conventional catalyst systems, for example, Ziegler-Natta or metallocene may be used. Such techniques and catalysts are described, for example, in WO06/010414; Polypropylene and other Polyolefins, by Ser van der Ven, Studies in Polymer Science 7, Elsevier 1990; WO06/010414, U.S. Pat. Nos. 4,399,054 and 4,472,524. Preferably, the heterophasic propylene copolymer is made using Ziegler-Natty catalyst.

The heterophasic propylene copolymer may be prepared by a process comprising
  polymerizing propylene and optionally α-olefin by contacting propylene and optionally α-olefin with a catalyst system to obtain the propylene-based matrix and
  subsequently polymerizing ethylene and α-olefin in the propylene-based matrix by contacting propylene and optionally α-olefin with a catalyst system to obtain the dispersed ethylene-α olefin copolymer. These steps are preferably performed in different reactors. The catalyst systems for the first step and for the second step may be different or same, but are preferably the same Catalyst System In the process of the invention, step a) and/or step b) may be performed by contacting propylene and the optional α-olefin with a catalyst system, for example a catalyst system which comprises a Ziegler-Natta catalyst and at least one external electron donor, which external electron donor is preferably chosen from the group of a compound having a structure according to Formula III $(R^{90})_2N\text{—}Si(OR^{91})_3$, a compound having a structure according to Formula IV: $(R^{92})Si(OR^{93})_3$ and mixtures thereof wherein each of $R^{90}$, $R^{91}$, $R^{92}$ and $R^{93}$ groups are each independently a linear, branched or cyclic, substituted or unsubstituted alkyl having between 1 and 10 carbon atoms, preferably wherein $R^{90}$, $R^{91}$, $R^{92}$ and $R^{93}$ groups are each independently a linear unsubstituted alkyl having between 1 and 8 carbon atoms, for example ethyl, methyl or n-propyl, for example diethylaminotriethoxysilane (DEATES), n-propyl triethoxysilane, (nPTES), n-propyl trimethoxysilane (nPTMS); and organosilicon compounds having general formula $Si(OR^a)_{4-n}R^b{}_n$, wherein n can be from 0 up to 2, and each of $R^a$ and $R^b$, independently, represents an alkyl or aryl group, optionally containing one or more hetero atoms for instance O, N, S or P, with, for instance, 1-20 carbon atoms; such as diisobutyl dimethoxysilane (DiBDMS), t-butyl isopropyl dimethyxysilane (tBuPDMS), cyclohexyl methyldimethoxysilane (CHMDMS), dicyclopentyl dimethoxysilane (DCPDMS) or di(iso-propyl) dimethoxysilane (DiPDMS). More preferably, the external electron donor is chosen from the group of di(iso-propyl) dimethoxysilane (DiPDMS), diethylaminotriethoxysilane (DEATES), n-propyl triethoxysilane, (nPTES), n-propyl trimethoxysilane (nPTMS) and mixtures thereof.

Preferably, step a) and b) of the process of the invention are performed by contacting propylene and the optional α-olefin with the same catalyst system.

Such organosilicon compounds mentioned above are known in the art (for instance as disclosed in documents WO2006/056338A1, EP1838741B1, U.S. Pat. No. 6,395, 670B1, EP398698A1, WO96/32426A).

Preferably, the catalyst system used in step I) is obtained by a catalyst preparation process comprising the steps of:
  providing a magnesium-based support;
  optionally activating said magnesium-based support using an activator;
  contacting said magnesium-based support with a Ziegler-Natta type catalytic species, and optionally one or more internal electron donors to yield a procatalyst, and
  contacting said procatalyst with a co-catalyst and at least one external electron donor;

More preferably, the catalyst system is obtained by
a catalyst preparation process comprising the steps of:
  A) providing a procatalyst obtainable via a process comprising the steps of:
    i) contacting a compound $R^4{}_z MgX^4{}_{2-z}$ with an alkoxy- or aryloxy-containing silane compound to give a first intermediate reaction product, being a solid $Mg(OR^1)_xX^1_{2-x}$, wherein: $R^4$ is the same as $R^1$ being a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has between 1 and 20 carbon atoms; $X^4$ and $X^1$ are each independently selected from the group of consisting of fluoride (F—), chloride (Cl—), bromide (Br—) or iodide (I—), preferably chloride; z is in a range of larger than 0 and smaller than 2, being 0<z<2;

ii) optionally contacting the solid $Mg(OR^1)_xX_{2-x}$ obtained in step i) with at least one activating compound selected from the group formed of activating electron donors and metal alkoxide compounds of formula $M^1(OR^2)_{v-w}(OR^3)_w$ or $M^2(OR^2)_{v-w}(R^3)_w$, to obtain a second intermediate product; wherein $M^1$ is a metal selected from the group consisting of Ti, Zr, Hf, Al or Si; $M^2$ is a metal being Si; v is the valency of $M^1$ or $M^2$; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has between 1 and 20 carbon atoms;

iii) contacting the first or second intermediate reaction product, obtained respectively in step i) or ii), with a halogen-containing Ti-compound and optionally an internal electron donor to obtain said procatalyst;

B) contacting said procatalyst with a co-catalyst and the at least one external electron donor to form a catalyst;

Preferably in step i) of said process, the compound of formula $R^4_zMgX^4_{2-z}$ is a phenyl or butyl Grignard reagent (PhMgCl or BuMgCl), more preferably a BuMgCl.

The aluminum/external donor molar ratio in the catalyst system preferably is between 0.1 and 200; more preferably between 1 and 100. In a Ti-based catalyst, the Si/Ti molar ratio in the catalyst system can range from 0.1 to 40, preferably from 0.1 to 20, even more preferably from 1 to 20 and most preferably from 2 to 10.

Some examples of Ziegler-Natta (pro)catalysts and their preparation method can be found in EP 1 273 595, EP 0 019 330, U.S. Pat. No. 5,093,415, Example 2 of U.S. Pat. Nos. 6,825,146, 4,771,024 column 10, line 61 to column 11, line 9, WO03/068828, U.S. Pat. No. 4,866,022, WO96/32426A, example I of WO 2007/134851 A1, all of which are hereby incorporated by reference.

The procatalyst thus prepared can be used in polymerization of olefins using an external donor and a co-catalyst.

The catalyst system according to the present invention includes a co-catalyst. As used herein, a "co-catalyst" is a term well-known in the art in the field of Ziegler-Natty catalysts and is recognized to be a substance capable of converting the procatalyst to an active polymerization catalyst. Generally, the co-catalyst is an organometallic compound containing a metal from group 1, 2, 12 or 13 of the Periodic System of the Elements (Handbook of Chemistry and Physics, 70th Edition, CRC Press, 1989-1990). The co-catalyst may include any compounds known in the art to be used as "co-catalysts", such as hydrides, alkyls, or aryls of aluminum, lithium, zinc, tin, cadmium, beryllium, magnesium, and combinations thereof. The co-catalyst may be a hydrocarbyl aluminum co-catalyst as are known to the skilled person. Preferably, the cocatalyst is selected from trimethylaluminium, triethylaluminum, triisobutylaluminum, trihexylaluminum, di-isobutylaluminum hydride, tri-octylaluminium, dihexylaluminum hydride and mixtures thereof, most preferably, the cocatalyst is triethylaluminium (abbreviated as TEAL).

The molar ratio of aluminum to titanium may be from about 5:1 to about 500:1 or from about 10:1 to about 200:1 or from about 15:1 to about 150:1 or from about 20:1 to about 100:1. The molar ratio of aluminum to titanium is preferably about 45:1. The aluminium/external donor molar ratio in the polymerization catalyst system preferably is from 0.1 to 200; more preferably from 1 to 100.

The internal electron donor can be any compound known in the art to be used as internal electron donor. Suitable examples of internal donors include aromatic acid esters, such as monocarboxylic acid ester or dicarboxylic acid esters (e.g. ortho-dicarboxylic acid esters such as phthalic acid esters) or benzoic acid esters, for example ethyl benzoate; (N-alkyl)amidobenzoates, 1,3-diethers, 1,5-diethers, silyl esters, fluorenes, succinates and/or combinations thereof.

It is preferred to use so-called phthalate free internal donors because of increasingly stricter government regulations about the maximum phthalate content of polymers. This leads to an increased demand in phthalate free catalyst compositions. In the context of the present invention, "essentially phthalate-free" of "phthalate-free" means having a phthalate content of less than for example 150 ppm, alternatively less than for example 100 ppm, alternatively less than for example 50 ppm, alternatively for example less than 20 ppm, for example of 0 ppm based on the total weight of the catalyst.

The molar ratio of the internal donor relative to the magnesium can be from 0.02 to 0.5. Preferably, this molar ratio is preferably between 0.05 and 0.2.

The heterophasic propylene copolymer of the composition of the invention consists of a propylene-based matrix and a dispersed ethylene-α-olefin copolymer. The propylene-based matrix typically forms the continuous phase in the heterophasic propylene copolymer. The amounts of the propylene-based matrix and the dispersed ethylene-α-olefin copolymer may be determined by $^{13}$C-NMR, as well known in the art.

The propylene-based matrix consists of a propylene homopolymer and/or a propylene-α-olefin copolymer consisting of at least 85 wt % of propylene and up to 15 wt % of α-olefin, for example ethylene, for example consisting of at least 90 wt % of propylene and up to 10 wt % of α-olefin, based on the total weight of the propylene-based matrix.

Preferably, the α-olefin in the propylene-α-olefin copolymer is selected from the group of α-olefins having 2 or 4 to 10 carbon atoms, for example ethylene, 1-butene, 1-pentene, 4-methyl-1-pentene, 1-hexen, 1-heptene or 1-octene, and is preferably ethylene.

Preferably, the propylene-based matrix consists of a propylene homopolymer. The fact that the propylene-based matrix consists of a propylene homopolymer is advantageous in that a higher stiffness is obtained compared to the case where the propylene-based matrix is a propylene-α-olefin copolymer.

The propylene-based matrix is present in an amount of 55 to 75 wt %. Preferably, the propylene-based matrix is present in an amount of at least 60 wt % or at least 65 wt % and/or at most 70 wt % or at most 72 wt %, based on the total heterophasic propylene copolymer. Preferably, the propylene-based matrix is present in an amount of 60 to 72 wt %, based on the total heterophasic propylene copolymer.

The propylene-based matrix is preferably semi-crystalline, that is it is not 100% amorphous, nor is it 100% crystalline. For example, the propylene-based matrix is at least 40% crystalline, for example at least 50%, for example at least 60% crystalline and/or for example at most 80% crystalline, for example at most 70% crystalline. For example, the propylene-based matrix has a crystallinity of 60 to 70%. For purpose of the invention, the degree of crystallinity of the propylene-based matrix is measured using differential scanning calorimetry (DSC) according to ISO11357-1 and ISO11357-3 of 1997, using a scan rate of 10° C./min, a sample of 5 mg and the second heating curve using as a theoretical standard for a 100% crystalline material 207.1 J/g.

Besides the propylene-based matrix, the heterophasic propylene copolymer also comprises a dispersed ethylene-α-olefin copolymer. The dispersed ethylene-α-olefin copolymer is also referred to herein as the 'dispersed phase'. The dispersed phase is embedded in the heterophasic propylene copolymer in a discontinuous form. The amount of the dispersed ethylene-α-olefin copolymer in the heterophasic propylene copolymer may herein be sometimes referred as RC.

The dispersed ethylene α-olefin copolymer has an average rubber particle size d50 of at most 1.15 μm as determined by scanning electron microscopy, such as by the method described in the experimental section of the present disclosure. The average rubber particle size of the dispersed ethylene α-olefin copolymer as determined by scanning electron microscopy is at least 0.3 μm, for example at least 0.4 μm, for example at least 0.5 μm, for example at least 0.6 μm.

Preferably, the amount of ethylene in the ethylene-α-olefin copolymer of the heterophasic propylene copolymer is 35 to 65 wt %, for example at least 40 wt % and/or at most 60 wt %, at most 55 wt %, at most 50 wt % or at most 45 wt %. The amount of ethylene in the dispersed ethylene-α-olefin copolymer in the heterophasic propylene copolymer may herein be sometimes referred as RCC2. RCC2 is also measured using $^{13}C$ NMR.

The α-olefin in the ethylene-α-olefin copolymer is preferably chosen from the group of α-olefins having 3 to 8 carbon atoms. Examples of suitable α-olefins having 3 to 8 carbon atoms include but are not limited to propylene, 1-butene, 1-pentene, 4-methyl-1-pentene, 1-hexen, 1-heptene and 1-octene. More preferably, the α-olefin in the ethylene-α-olefin copolymer is chosen from the group of α-olefins having 3 to 4 carbon atoms and any mixture thereof, more preferably the α-olefin is propylene, in which case the ethylene-α-olefin copolymer is ethylene-propylene copolymer.

The dispersed ethylene-α-olefin copolymer is present in an amount of 45 to 25 wt %. Preferably, the dispersed ethylene-α-olefin copolymer is present in an amount of at most 40 wt % or at most 35 wt % and/or at least 28 wt % or at least 30 wt %, based on the total heterophasic propylene copolymer. Preferably, the dispersed ethylene-α-olefin copolymer is present in an amount of 28 to 40 wt % based on the total heterophasic propylene copolymer.

The dispersed ethylene-α-olefin copolymer of the heterophasic propylene copolymer (A) is herein sometimes referred as "internal rubber" while the ethylene-α-olefin copolymer (C) added separately from the heterophasic propylene copolymer (A) to the composition is herein sometimes referred as "external rubber".

In the heterophasic propylene copolymer in the composition of the invention, the sum of the total weight of the propylene-based matrix and the total weight of the dispersed ethylene-α-olefin copolymer is 100 wt % of the heterophasic propylene copolymer.

Preferably, the heterophasic propylene copolymer has a fraction soluble in p-xylene at 25° C. (CXS) measured according to ISO 16152:2005 of 45 to 25 wt %. More preferably, the heterophasic propylene copolymer has CXS of at most 40 wt % or at most 35 wt % and/or at least 28 wt % or at least 30 wt %. Preferably, the amount of the fraction soluble in p-xylene at 25° C. (CXS) measured according to ISO 16152:2005 in the heterophasic propylene copolymer is 28 to 40 wt %.

Preferably, the amount of ethylene in the heterophasic propylene copolymer (sometimes referred as TC2) is in the range of 10 to 17.5 wt %, for example in the range of 10 to 15 wt % based on the heterophasic propylene copolymer.

Preferably, the MFI of the heterophasic propylene copolymer is in the range of 18.0 to 60.0 dg/min, more preferably 20.0 to 60.0 dg/min, measured according to ISO1133 (2.16 kg/230° C.). Such a range of MFI is suitable for injection moulding.

The value of the MFI of the heterophasic propylene copolymer (MFI heterophasic) refers to the final MFI of the heterophasic propylene copolymer. To exemplify this: In case the heterophasic propylene copolymer is not subjected to vis-breaking or shifting by melt-mixing with a peroxide, the MFIheterophasic is the original MFI value of the heterophasic propylene copolymer. In case the heterophasic propylene copolymer is subjected to vis-breaking or shifting by melt-mixing with a peroxide, the MFIheterophasic is the value of the heterophasic propylene copolymer after such vis-breaking or shifting.

Preferably, A) the heterophasic propylene copolymer is made by
I) polymerizing monomers to obtain an intermediate heterophasic propylene copolymer having an intermediate melt flow index and
II) visbreaking said intermediate heterophasic propylene copolymer, for example during extrusion directly after step I), to obtain the final heterophasic propylene copolymer (A) having a melt flow index (final melt flow index) that is higher than the melt flow index of the intermediate heterophasic propylene copolymer (intermediate melt flow index).

The heterophasic propylene copolymer has a flexural modulus of less than 1000 MPa as determined at 23° C. in parallel direction according to ASTM D790 Procedure B on a sample of 65×12.7×3.2 mm Preferably, the heterophasic propylene copolymer consists of one type of heterophasic propylene copolymer, i.e. the heterophasic propylene copolymer is not a mixture of two or more different types of heterophasic propylene copolymers which have different amounts of the dispersed ethylene-α-olefin copolymer in the heterophasic propylene copolymer, different amounts of ethylene in the dispersed ethylene-α-olefin copolymer, a different molecular weight distribution and/or a different MFR. For example, the heterophasic propylene copolymer has a unimodal molecular weight distribution. The molecular weight distribution can thereby easily be determined e.g. by size exclusion chromatography.

The total amount of (b) the dispersed ethylene-α-olefin copolymer in the heterophasic propylene copolymer (A) and the ethylene-α-olefin copolymer (C) is 30 to 60 wt % based on the total composition.

Glass Fibers (B)

The thermoplastic composition of the invention comprises glass fibres (B). The glass fibres, as added to the composition, can comprise long and/or short glass fibres. Compositions filled with short glass fibres can be made by mixing chopped strands of pre-determined length with a thermoplastic polymer in an extruder, during which the glass fibres are dispersed in the molten thermoplastic. Compositions filled with long glass fibres can be made by a cable-wiring process or by a pultrusion process. The length of the added glass fibres can decrease during processing and as such the final length of the glass fibres in the composition and, in particular after compounding, can be less than that of the added glass fibres. Long glass fibres can have an average fibre length, before compounding, of 1 mm or more. Preferably, the long glass fibres can have an average fibre length, before compounding, of 1-50 mm, more preferably 1-20 mm, and even more preferably 5-15 mm. Short glass fibres can have an average fibre length, before compounding, of 1-10 mm, preferably 2-8 mm, more preferably 3-7 mm. The diameter of the glass fibres, before compounding, can be 5-50 μm, preferably 8-30 μm, more preferably 10-20 μm.

The aspect ratio of the fibres can be in the range of 200-2000, preferably in the range of 200-1000, such as in the range of 250-750. The aspect ratio refers to the ratio between the average fibre length and the average fibre diameter.

Generally, the length of glass fibres in a polymer composition decreases during a melt processing step like injection moulding. The average length of the glass fibres in a moulded article made from the composition according to the invention, i.e. after compounding, is therefore typically significantly shorter. Typically, after compounding, the glass fibres have an average fibre length of 1 mm or less. Preferably, the average fibre length in a moulded article (after compounding) can be from 0.05-0.9 mm, more preferably 0.1-0.6 mm, even more preferably 0.1-0.4 mm.

Since the average glass fibre diameter does not substantially change upon compounding, the average glass fibre diameter in a moulded article made from the composition according to the invention, i.e. after compounding, can be in the range of 5-50 μm, preferably 8-30 μm, such as 10-20 μm.

Suitably, the glass fibres can be coated in order to improve the interaction with the polypropylene. Such coated glass fibres are also known in the art as sized glass fibres. Such coatings typically include amino-silane or silane coatings. Amino-silane and silane coated glass fibres are commercially available. Some examples include ECS03-480H (from NEG), 03T480 (from NEG), HP3270 (from PPG Industries), HP3299 (from PPG Industries), ECS 305H (from CPIC), ECS 305K (from CPIC), D52100-13P (from Binani 3B fibreglass), DS2200-10P (from Binani 3B fibreglass), and DS2200-13P (from Binani 3B fibreglass).

The glass fibres may be treated with a coupling agent so as to improve the interaction between the glass fibres and the polypropylene. Such coupling agents facilitate adhesion of the polypropylene to the polar glass fibre surface. Suitable coupling agents include functional organo-silanes, transition metal coupling agents, amino-containing Werner coupling agents and mixtures thereof. Examples of functional organo-silane coupling agents include 3-aminopropyldimethylethoxysilane, γ-aminopropyltriethoxysilane, γ-aminopropyltrimethoxysilane, β-aminoethyltriethoxysilane, N-β-aminoethylamino-propyltrimethoxysilane, γ-isocyanatopropyltriethoxysilane, vinyl-trimethoxysilane, vinyl-triethoxysilane, allyl-trimethoxysilane, mercaptopropyltrimethoxysilane, mercaptopropyltriethoxysilane, glycidoxypropyltriethoxysilane, glycidoxypropyltrimethoxysilane, 4,5-epoxycyclohexyl-ethyltrimethoxysilane, ureidopropyltrimethoxysilane, ureidopropyltriethoxysilane, chloropropyltrimethoxysilane, and chloropropyltriethoxysilane. Examples of transition metal coupling agents include chrome, titanium and zirconium coupling agents.

Examples of amino-containing Werner type coupling agents include complex compounds in which a trivalent nuclear atom such as chromium is coordinated with an organic acid having amino functionality. Such treated glass fibres are known in the art. The amount of glass fibres (B) in the thermoplastic composition of the invention can vary depending on the specific application and needs. For example, the amount of glass fibres in the thermoplastic composition may be 10-40 wt %, for example 20-30 wt % or 20-25% based on the total composition.

The glass fibre can be prepared from continuous lengths of fibres by, for example, a sheathing or wire-coating process, by crosshead extrusion, or by a pultrusion technique. Using these technologies, fibres strands impregnated or coated with a polymer are formed. The fibre can then be cut into a desired length and can optionally be formed into pellets or granules. The fibres can be further processed, e.g., by injection moulding or extrusion processes, into a composition.

Ethylene-α-Olefin Copolymer (C)

The composition according to the invention further comprises an ethylene-α-olefin copolymer (external rubber), wherein the α-olefin is chosen from the group of α-olefins having 3 to 12 carbon atoms. The copolymer can be a random or block copolymer. Preferably, the α-olefin is chosen from the group of α-olefins having 4 to 8 carbon atoms. Preferably, the ethylene-α-olefin copolymer is a copolymer of ethylene and one type of α-olefin. Exemplary C4 to C8 alpha olefins include 1-butene, 1-pentene, 4-methyl-1-pentene, 1-hexene, 1-heptene, and 1-octene, among which, 1-octene is specifically mentioned. The ethylene content of said copolymer can vary widely, for example, 40 to 80 wt %, specifically, 50 to 75 wt %, more specifically, 60 to 75 wt %. The ethylene-α-olefin copolymer can have a density of 850 to 880 kg/m$^3$ and a melt flow index of 0.5 to 35 g/10 min, specifically, 1 to 30 g/10 min, more specifically, 2 to 10 g/10 min, even more specifically, 4 to 6 g/10 min, measured at 190° C. under 2.16 kg force according to ISO 1133.

Preferably, the amount of the ethylene-α-olefin copolymer (C) is 20 to 30 wt %.

The composition may comprise further components in addition to (A), (B) and (C).

Silicone Particles

The composition according to the invention may comprise silicone particles. The amount of the silicone particles based on the total composition may be 0 to 10 wt %, preferably 0.5 to 5 wt %, for example 0.7 to 3 wt %.

The silicone particles can be, for example, spherical, oblong, ovoidal, cylindrical, or a combination comprising one or more of the foregoing. Specifically, the silicone particles can be essentially spherical in shape and can have a mean bead diameter of 1.8 to 10.5 micrometers, specifically, 2 to 10 micrometers, more specifically, 5 to 7 micrometers. The bulk specific gravity of the silicone particles is 0.35 to 0.67 kilograms per liter (kg/L). The addition of the silicone particles can result in an improvement in the haptic properties as compared to a composition without said particles.

Silicone particles comprise a three-dimensional polymer chain of the formula $$R_xSiO_{2-(x/2)} \qquad (I)$$

wherein x is a positive number greater than or equal to 1, and each R is independently an aliphatic hydrocarbon group, an aromatic hydrocarbon, or an unsaturated group.

x may be 1 to 1.9, more specifically, 1 to 1.5, and even more specifically, 1 to 1.2; and each R is independently an organic group, such as an aliphatic hydrocarbon group, e.g., methyl, ethyl, or butyl; or an aromatic hydrocarbon, e.g., phenyl, and can comprise an unsaturated group, e.g., vinyl.

R may be a hydrocarbon group having 1 to 8, specifically, 1 to 5, carbon atoms, more specifically, methyl. Specifically mentioned silicon resin particles comprise methylsilsequioxane.

Suitable silicone particles are commercially available from Momentive Performance Materials Japan LLC, under the name of "Tospearl" silicone resin particles. These particles have a three-dimensional network structure in which each silicone atom is bonded to one methyl group.

Coupling Agent

The composition according to the invention can comprise a modified polypropylene that can result in improved properties by affecting glass fiber-polypropylene interactions. Examples of suitable modified polypropylenes are polypropylenes grafted with for example an unsaturated organic compound, such as a carboxylic acid, an anhydride, an ester, or salts thereof. Suitable examples include maleic, fumaric, (meth) acrylic, itaconic or cinnamic acid or anhydride, ester or salt thereof. Suitable examples include maleic, fumaric, (meth)acrylic, itaconic or cinnamic acid or anhydride, ester or a salt thereof, among which, maleic anhydride is specifically mentioned. The grafted groups can be presented in an amount of greater than or equal to 0.5 wt %, specifically, greater than or equal to 0.7 wt %, based on the total weight of the modified polypropylene. The density of the modified polypropylene can be 0.8 to 1.0 g/cm³, for example about 0.9 g/cm³. The melt flow index of the modified polypropylene (measured in accordance with ISO 1133 using a 2.16 kg weight and at a temperature of 230° C.) can be greater than or equal to 25 g/10 min, for example, greater than or equal to 100 g/10 min. The modified polypropylene can be produced by reactive extrusion. As used herein, modified polypropylene comprises modified homopolypropylene, for example, maleic anhydride functionalized homopolypropylene produced by reactive extrusion.

The amount of modified polypropylene can vary widely, but for economical reasons the amount normally will be rather low, for example, less than or equal to 5 wt %, specifically, less than 4, 3, 2 or even 1 wt %, based on total weight of the composition. The modified polypropylene can be present in an amount of 0.1 to 4 wt %, based on the total weigh of the composition.

Processing Aid

The composition can comprise a processing aid such as a polysiloxane, where the polysiloxane can comprise an ultra-high molecular weight polysiloxane with a kinematic viscosity of larger than 10×10⁶ centistokes (cSt) determined in accordance with ASTM D445 Kinematic Viscosity. The polysiloxane can be added to the composition as a olymer dispersion, where the polysiloxane is dispersed in a polymer matrix, for example, in polypropylene. The polypropylene matrix can comprise the above mentioned polypropylene, specifically, the polypropylene matrix can comprise a polypropylene homopolymer. The siloxane content of the dispersion can be 40 to 60 wt %, for example about 50 wt %, based on the total weight of the dispersion. As used herein, the siloxane comprises polydimethyl siloxane or functionalized polydimethyl siloxane. An example of such a polysiloxane processing aide is MB50-001 Masterbatch, commercially available from Dow Corning™. The processing aide can be present in an amount of 0.2 to 10 wt %, specifically, 0.2 to 5 wt %, more specifically, less than or equal to 1 wt %, even more specifically, less than or equal to 0.5 wt %, based on the total weight of the composition.

Oleamide/Erucamide

The composition can comprise 0.1 to 1 wt % of oleamide and/or erucamide based on the total weight of the composition. Oleamide and erucamide are the amides of fatty acids oleic acid and erucic acid, and have molecular formula C18H35NO and C22H43NO, respectively. Such an amount of fatty acid amide can decrease the visibility of surface damage like scratches on a molded article. Accordingly, the amount of fatty acid amide can be less than or equal to 1 wt %, specifically, 0.1 to 0.6 wt % based on the total weight of the composition. Compositions comprising greater than 1 wt %, specifically, greater than or equal to 1.5 wt % can experience excessive migration of the compound to the surface of the molded article and cause problems like stickiness etc.

Various Additives

The composition can comprise an additive including a nucleating agent, a clarifier, a release agent, a plasticizer, an antioxidant, a stabilizer (such as a thermal stabilizer, a visible light stabilizer, an ultraviolet light stabilizer (such as a hindered amine light stabilizer), and an antioxidant), a colorant, a flame retardant, a lubricant (such as calcium stearate), a synergist, a mold release agent, a flow enhancer, an anti-static agent, a glass filler, a filler that is different from the glass filler (such as talc), a scratch resistant additive (such as a silicone, a low density polyethylene that can be a long chain branched low density polyethylene), or a combination comprising at least one of the foregoing. The additive can be present in an amount of 0.5 to 20 wt %, specifically, 2 to 15 wt %, based on the total weight of the composition. The additive can be present in an amount of 0 to 10 wt %, specifically, 2 to 10 wt %, based on the total weight of the composition.

Stabilizers including, for example, a UV stabilizer, a visible light stabilizer, a thermal stabilizer, an antioxidant, or a combination comprising at least one of the foregoing can be present in an amount of 0.1 to 2 wt %, specifically, 0.2 to 1 wt %, more specifically, 0.3 to 0.8 wt % based on the total weight of the composition.

Colorant

Specifically mentioned other optional additives include colorant such as carbon black or pigments. The colorant can be present in an amount of 0.1 to 5 wt %, specifically, 0.5 to 4 wt % based on the total weight of the composition.

Process for Making Composition

The composition of the invention may be obtained by a process comprising melt-mixing (A), (B) and (C) and optional components by using any suitable means. Accordingly, the invention further relates to a process for the preparation of the composition according to the invention comprising melt mixing (A), (B), (C) and optional components. Preferably, the composition of the invention is made in a form that allows easy processing into a shaped article in a subsequent step, like in pellet or granular form. The composition can be a mixture of different particles or pellets; like a blend of the heterophasic propylene copolymer and a masterbatch of additives. Preferably, the composition of the invention is in pellet or granular form as obtained by mixing all components in an apparatus like an extruder; the advantage being a composition with homogeneous and well-defined concentrations of the additives.

With melt-mixing is meant that the components (B), (C) and optional components are mixed with (A) at a temperature that exceeds the melting point of the heterophasic propylene copolymer. Melt-mixing may be done using techniques known to the skilled person, for example in an extruder. Generally, in the process of the invention, melt-mixing is performed at a temperature in the range from 200-300° C.

Suitable conditions for melt-mixing, such as temperature, pressure, amount of shear, screw speed and screw design when an extruder is used are known to the skilled person.

When using an extruder, a conventional extruder such as a twin-screw extruder may be used. The temperature can vary through the different zones of the extruder as required. For example, the temperature may vary from 100° C. in the feed zone to 300° C. at the die. Preferably, the temperature in the extruder varies from 200 to 265° C.; lower temperatures may impede reactions between the peroxide and an optional co-agent, for example polyfunctional monomers such as BDDMA and, as a consequence, compositions with the desired melt flow index may not be obtained; too high temperatures may induce undesired degradation processes, which may for example result in compositions having poor mechanical properties. Likewise, the screw speed of the extruder may be varied as needed. Typical screw speed is in the range from about 100 rpm to about 400 rpm.

Further Aspects

The composition according to the invention may be processed by any conventional technique known in the art into an article. Suitable examples of processing techniques wherein the composition according to the invention may be used include but are not limited to injection moulding, rotational moulding, compression moulding, extrusion, sheet extrusion, foam extrusion and thin-walled injection moulding.

The invention further relates to an article comprising the composition according to the invention. In particular, the invention relates to an article comprising the composition according to the invention, wherein the article is made by one of the processing techniques mentioned above. Injection moulding is widely used to produce articles such as for example caps and closures, batteries, pails, containers, automotive exterior parts like bumpers, automotive interior parts like instrument panels, or automotive parts under the bonnet. Thin wall injection moulding may for example be used to make thin wall packaging.

Therefore, preferably, the article of the invention is an injection moulded part, preferably an automotive interior part, an automotive exterior part or a part under the bonnet.

Preferably, the article comprises at least 99 wt %, for example at least 99.5 wt %, of the composition according to the invention based on the total weight of the article. For example, the article substantially consists of the composition according to the invention. Such article is called 1K article (one component article) and is a cost-effective solution compared to a 2K article wherein a soft touch layer is put as a layer on top of another (plastic) material. 2K article is commonly used since rigid plastic with good stiffness and good soft touch feel typically cannot be reached by one component. The composition according to the invention is rigid while having good stiffness and good soft touch feel, which allows the manufacturing of a 1K article.

Preferably, the article is an injection moulded part, preferably an automotive interior part, preferably wherein the article comprises at least 99 wt %, for example at least 99.5 wt %, of the composition according to the invention based on the total weight of the article.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

EXAMPLES

The volume average size of the rubber particles of the dispersed ethylene α-olefin copolymer, represented by the $d_{50}$ parameter, is obtained by digital image analysis of scanning electron micrographs. Scanning electron microscopy (SEM) is performed on injection molded plaques. Samples of the injection molded plaques are trimmed from surface to bulk at −120° C. The trimmed blocks are stained for 24 hours in $RuO_4$ solution. After staining, sections with a thickness of 70 nm are obtained. The remaining blocks are fixed into a SEM sample holder and coated with a conductive Ir layer. Imaging is done in a FEI Versa 3D FEGSEM at an acceleration voltage of 5 kV. The resulting micrographs are digitally analyzed using Olympus stream software using the assumptions and mathematical relations as described in D. Sahagian, A. Proussevitch: "3D particle size distributions from 2D observations: stereology for natural applications." Journal of Volcanology and geothermal Research, 84 (1998) 173-196, to characterize the dispersed rubber phase in terms of its $d_{10}$, $d_{50}$, $d_{90}$ and distribution width. Outside the area where the sample shows particles, reference material is present which has a certain color ($C_{ref}$). The part for the particles that was taken into account for the measurements was determined by measuring the actual color of the particle pixel ($C_{particle}$) and subtracting from this value $C_{ref}$. A pixel lies within the particle, when the $C_{particle}$ is larger than $C_{ref}*1.05$. In this way noise which may be present in the reference material is filtered out and not taken into account in determining the particle size. The particle size is the sum of all pixels which have a $C_{particle} > C_{ref}*1.05$.

The melt flow index (MFI) was determined according to the International Organization for Standardization (ISO) test standards ISO 1133 at 230° C. under a load of 2.16 kilogram (kg).

The total rubber content is the sum of the internal rubber (b) in the heterophasic propylene copolymer (A) and the external rubber (C) in wt % based on the total composition.

The ash content was determined according to ISO 3451 measured after 15 minutes (min) at 525° C.

Notched Izod impact parallel measurements were determined at 23° C. according to ISO180/1A and at −20° C. according to ISO180/1A.

The flexural modulus and the flexural strength were determined at 23° C. according to the ASTM D790 Procedure B. ASTM D790 parallel and perpendicular measurements were done on 65×12.7×3.2 mm cut samples.

Tensile properties were measured according to ISO 527/1A at 23° C.

Gloss measurements were determined according to ISO 2813 at 23° C.

Shrinkage measurements were determined according to ISO 294-4 (Apr. 23, 1990). The sample size used was 65×65×3.2 mm with measurements taken 24 h at 23° C. after moulding and after 1 h at 90° C. Parallel shrinkage indicated is parallel to the flow direction, perpendicular is the shrinkage in cross flow direction. Shrinkage was measured on 5 samples and averaged.

Warpage measurements were determined by the ratio of shrinkage in the parallel and perpendicular directions. The tests were performed on samples which were kept at 23° C. at 24 hours before measuring.

Falling dart impact (VEM) at −10° C. after 7 days was determined according to ISO 6603-B2.

Soft-touch performance was determined by a panel of 5 experts in soft touch properties. Specifically, the experts felt the surface of an injection molded plaque of the respective compositions and assigned it a haptic rating + to ++, where a haptic rating of ++ is considered as better performing.

Tiger-stripe performance: Samples of the compositions were injection moulded into two types of ruler-shaped test specimens. Two types of moulds were used, a so-called fan gate mould and a so-called pin-point gate mould. The molten polyolefin composition was extruded through a nozzle having an upper end having a diameter of 4 mm and a lower end having a diameter of 7 mm. The lower end of the nozzle merges with a rectangular channel of the mould.

Along the length of the fan gate mould, the width changes from about 6.5 mm to 30 mm and the thickness changes from about 3 mm to 2 mm. After the fan shaped part, an elongated part follows having a width of 30 mm and a thickness of 3 mm. The rectangular part is about 34 mm in length. The fan shaped part of the mould is about 225 mm in length.

The pin-point gate mould is identical to the fan gate except that the rectangular part comprises a portion having a width of 1.2 mm over a length of about 6 mm.

The melt temperature during the injection moulding is set at 200° C., 230° C., or 260° C., respectively, and the mould is kept at room temperature. Three different screw speeds are used according to the conditions in Table 1.

TABLE 1

| Condition | Screw speed injection [mm/s] | Flow rate [cm³/s] | Injection time [s] |
|---|---|---|---|
| Low speed | 20 | 14.1 | 2.49-2.51 |
| Medium speed | 50 | 35.3 | 0.99-1.0 |
| High speed | 160 | 113.1 | 0.38-0.39 |

Specimens having a smooth side and a textured side were manufactured. After moulding each of the specimens is visually observed for occurrence of tiger stripes on its textured side. The quality of the surface was evaluated on a scale of 1 to 10, 10 being the best performance, as described in Table 2.

The average tiger stripe rating is defined as the numerical average of the individual tiger stripe ratings for each of the test specimens manufactured at low, medium and high speed, manufactured with the pin-gate and the fan-gate and measured on the smooth and on the textured surface. Hence, the average tiger stripe rating as defined herein is the average of 12 individual tiger stripe measurements.

TABLE 2

| | |
|---|---|
| 1 | very sharp transition between glossy and dull sections visible seen from any angle |
| 2 | sharp transitions between glossy and dull sections seen from any angle |
| 3 | very visible transitions between glossy and dull sections seen from any angle |
| 4 | visible transitions between glossy and dull sections seen from any angle |
| 5 | less visible transitions between glossy and dull sections seen from any angle |
| 6 | visible transitions between glossy and dull sections seen from a specific angle only |
| 7 | less visible transitions between glossy and dull sections seen from a specific angle only |
| 8 | no transitions between glossy and dull sections visible and surface appearance inhomogeneous |
| 9 | no transitions between glossy and dull sections visible and surface appearance homogeneous |
| 10 | no transitions between glossy and dull sections visible and surface is perfect |

The materials used in the Examples are described in

TABLE 3

| Component | Description |
|---|---|
| PP1 | A heterophasic polymer comprising 18.5 wt % of ethylene-propylene copolymer dispersed in a polypropylene homopolymer, wherein the amount of ethylene in the ethylene-propylene copolymer is 53 wt %. MFI of the heterophasic polymer is 33 dg/min measured at 230° C. under a load of 2.16 kg according to ISO 1133. The flexural modulus at 23° C. in the parallel direction is 1530 MPa. The volume average size of the rubber particles, represented by the $d_{50}$ parameter, is 1.29 μm. |

TABLE 3-continued

| Component | Description |
|---|---|
| PP2 | A heterophasic polymer comprising 24 wt % of ethylene-propylene copolymer dispersed in a polypropylene homopolymer, wherein the amount of ethylene in the ethylene-propylene copolymer is 56.5 wt %. MFI of the heterophasic polymer is 14 dg/min measured at 230° C. under a load of 2.16 kg according to ISO 1133. The flexural modulus at 23° C. in the parallel direction is 1500 MPa. The volume average size of the rubber particles, represented by the $d_{50}$ parameter, is 1.23 μm. |
| PP3 | A heterophasic polymer comprising 33.5 wt % of ethylene-propylene copolymer dispersed in a polypropylene homopolymer, wherein the amount of ethylene in the ethylene-propylene copolymer is 51.5 wt %. MFI of the heterophasic polymer is 17 dg/min measured at 230° C. under a load of 2.16 kg according to ISO 1133. The flexural modulus at 23° C. in the parallel direction is 735 MPa. The volume average size of the rubber particles, represented by the $d_{50}$ parameter, is 1.25 μm. |
| PP4 | A heterophasic polymer comprising 30.1 wt % of ethylene-propylene copolymer dispersed in a polypropylene homopolymer, wherein the amount of ethylene in the ethylene-propylene copolymer is 43.9 wt %. MFI of the final heterophasic polymer is 20.5 dg/min measured at 230° C. under a load of 2.16 kg according to ISO 1133. The flexural modulus at 23° C. in the parallel direction is 786 MPa. The volume average size of the rubber particles, represented by the $d_{50}$ parameter, is 1.12 μm. |
| PP5 | A heterophasic polymer comprising 30.1 wt % of ethylene-propylene copolymer dispersed in a polypropylene homopolymer, wherein the amount of ethylene in the ethylene-propylene copolymer is 43.9 wt %. MFI of the final heterophasic polymer is 41.2 dg/min measured at 230° C. under a load of 2.16 kg according to ISO 1133. The flexural modulus at 23° C. in the parallel direction is 743 MPa. The volume average size of the rubber particles, represented by the $d_{50}$ parameter, is 0.97 μm. |
| PP6 | A heterophasic polymer comprising 31.1 wt % of ethylene-propylene copolymer dispersed in a polypropylene homopolymer, wherein the amount of ethylene in the ethylene-propylene copolymer is 43.7 wt %. MFI of the final heterophasic polymer is 20.4 dg/min measured at 230° C. under a load of 2.16 kg according to ISO 1133. The flexural modulus at 23° C. in the parallel direction is 810 MPa. The volume average size of the rubber particles, represented by the $d_{50}$ parameter, is 1.03 μm. |
| PP7 | A heterophasic polymer comprising 31.1 wt % of ethylene-propylene copolymer dispersed in a polypropylene homopolymer, wherein the amount of ethylene in the ethylene-propylene copolymer is 43.7 wt %. MFI of the final heterophasic polymer is 40.6 dg/min measured at 230° C. under a load of 2.16 kg according to ISO 1133. The flexural modulus at 23° C. in the parallel direction is 756 MPa. The volume average size of the rubber particles, represented by the $d_{50}$ parameter, is 0.93 μm. |
| Alpha-olefin | Ethylene-octene copolymer having a MFI of 5.0 decigrams per minute (dg/min) measured at 190° C. under a load of 2.16 kg according to ASTM D 1238 |
| Talc | Talc Filler, d50 is 1.4 μm, d98 is 7.0 μm as measured on Sedigraph 5120. |
| GF | Glass fibers, 10 micrometer diameter, 4-5 mm long |
| Coupling Agent | Maleic anhydride (MAh) functionalized homopolypropylene produced by reactive extrusion. MAh level 0.5 to 1 wt %, MFI 100-120 [g/10 min] at 190° C./1.2 kg |
| Tospearl 2000B | Silicone Particles (methylsilsequioxane), average diameter ($d_{50}$) is 6.0 μm |
| PDMS master batch | 50% of an ultrahigh molecular weight polydimethylsiloxane polymer dispersed in a polypropylene homopolymer |
| Stabilizer package | A package of classical antioxidant & processing stabilizers |
| Slip agent | Fatty acid amide |
| Colorant | Carbon black or pigments master batch |

Catalyst A

Catalyst A is prepared according to the method described in U.S. Pat. No. 5,093,415 of Dow, hereby incorporated by reference. This patent discloses an improved process to prepare a catalyst including a reaction between titanium tetrachloride, diisobutyl phthalate, and magnesium diethoxide to obtain a solid material. This solid material is then slurried with titanium tetrachloride in a solvent and phthaloyl chloride is added. The reaction mixture is heated to obtain a solid material which is reslurried in a solvent with titanium tetrachloride. Again this was heated and a solid collected. Once again the solid was reslurried once again in a solution of titanium tetrachloride to obtain a catalyst.

PP1-PP7 were prepared using a two-step process as described here below:

Step I)

Five intermediate heterophasic propylene copolymers (A, B, C, D and E) were produced by co-polymerization of propylene and ethylene using two reactors in series. In the first reactor (temperature 60-85° C., pressure $2.2.10^1$-$3.0\,10^1$ bar), the propylene homopolymer matrix phase was prepared. After polymerization, the powder was transported from the first to the second reactor (temperature 60-85° C., pressure $2.2.10^1$-$3.0\ 10^1$ bar) where the polymerization of the rubber phase consisting of an ethylene-propylene copolymer was done. Materials were prepared using the catalyst system composed of catalyst A and di(iso-propyl) dimethoxysilane (DiPDMS). Table 4 provides an overview of reactor powders A-E that were prepared in this manner.

MFR R1 represents the melt flow rate of the propylene homopolymer manufactured in the first reactor. MFR R2 represents the melt flow rate of the intermediate heterophasic propylene copolymer powder obtained after the polymerization of the rubber phase in the second reactor.

RC represents the amount of rubber phase (ethylene-propylene copolymer) based on the total weight of the heterophasic propylene copolymer and is measured using $^{13}$C-NMR. RCC2 is the ethylene weight percentage of the ethylene-propylene copolymer phase and is also measured by $^{13}$C-NMR.

CXS and CXI represent, respectively, the amount of soluble and insoluble fractions in p-xylene at 25° C. based on the total weight of the heterophasic propylene copolymer. IV-CXS and IV-CXI represent the intrinsic viscosities of the p-xylene soluble and p-xylene insoluble fractions, respectively, measured in decaline at 135° C. according to DIN EN ISO 1628-1 and -3. The IV ratio is defined as the ratio of IV-CXS to IV-CXI.

TABLE 4

Properties of intermediate heterophasic propylene copolymers

| Exp # | MFR R1 dg/min | MFR R2 dg/min | RC wt. % | RCC2 wt. % | CXS wt. % | IV-CXS dl/g | CXI wt. % | IV-CXI dl/g | IV ratio |
|---|---|---|---|---|---|---|---|---|---|
| A | 68 | 33 | 18.5 | 53 | 16.7 | 2.3 | 83.3 | 1.15 | 2.0 |
| B | 4.7 | 1.5 | 24 | 56.5 | 21.9 | 4.7 | 78.1 | 2.0 | 2.35 |
| C | 4.5 | 1.1 | 33.5 | 51.5 | 30.9 | 4.4 | 69.1 | 2.0 | 2.20 |
| D | 21.7 | 4.6 | 30.1 | 43.9 | 28.5 | 3.0 | 71.5 | 1.65 | 1.82 |
| E | 30.2 | 3.7 | 31.1 | 43.7 | 29.1 | 4.3 | 70.9 | 1.65 | 2.61 |

Step II)

For achieving higher flow propylene heterophasic copolymers, reactor powders B, C, D and E (the intermediate heterophasic propylene copolymer powders) were peroxide shifted (i.e. visbreaking) to higher melt flow rates to obtain the final heterophasic propylene copolymers (PP2, PP3, PP4, PP5, PP6 and PP7). This was done by feeding the powder to an extruder and adding Luperco 802PP40 as a peroxide (1,4-bis(2-tert-butylperoxypropan-2-yl)benzene, CAS Registry Number: 2781-00-2) in different concentrations to achieve for each reactor powders different final melt flow rates. Table 5 lists details of the visbreaking experiments for the different reactor powders including starting MFR (intermediate MFR), target MFR (final MFR) and the amount of peroxide in weight percentage. Besides the peroxide, some additives common in the art were also added (0.25 weight percentage based on the total weight of the final heterophasic propylene copolymer). The additive package was the same for all experiments. PP1 was not visbroken, but was also extruded a second time with no peroxide to have the same processing history than other examples. The final heterophasic propylene copolymers have the same amount of rubber phase (RC) and the same amount of ethylene in the rubber phase (RCC2) than the intermediate heterophasic propylene copolymers (Table 3).

TABLE 5

MFR change

| Exp # | Intermediate powder | Intermediate MFR dg/min | Final MFR dg/min | Peroxide wt. % |
|---|---|---|---|---|
| PP1 | A | 33 | 33 | 0 |
| PP2 | B | 1.5 | 14 | 0.105 |
| PP3 | C | 1.1 | 17 | 0.125 |
| PP4 | D | 4.6 | 20.5 | 0.085 |
| PP5 | D | 4.6 | 41.2 | 0.2 |
| PP6 | E | 3.7 | 20.4 | 0.095 |
| PP7 | E | 3.7 | 40.6 | 0.215 |

PP1 is not peroxide shifted, but extruded a second time to have the same processing history than other examples.
PP2 is peroxide shifted heterophasic copolymer from experiment B, PP3 is peroxide shifted heterophasic copolymer from experiment C, PP4 and PP5 are peroxide shifted heterophasic copolymers from experiment D, PP6 and PP7 are peroxide shifted heterophasic copolymers from experiment E.
intermediate MFR is the MFR of the intermediate heterophasic propylene copolymer
Final MFR is the MFR of the final heterophasic propylene copolymer.

Examples CE1-E6

The components as recited in Table 3 for CE1-E6 (Examples CE1-CE2 and E3-E6) were mixed together and injected molded using a standard machine equipped with a three-zone screw typically used for mineral filled polypropylene compounds at a temperature of 240° C. The compositions of Examples CE1-E6 are shown in Table. Amounts of components are in wt %, unless otherwise indicated. Some common in the art stabilizers were also added (0.5 wt %). The stabilizer package was the same for all experiments.

The total rubber content is defined as summation of the amount of ethylene-propylene copolymer in the heterophasic propylene copolymer, proportional to the amount of base resin used in the compositions, and the amount of Alpha-olefin added during compounding step.

TABLE 6

| Compositions | CE1 | CE2 | E3 | E4 | E5 | E6 |
|---|---|---|---|---|---|---|
| PP1 (wt %) | 10 | | | | | |
| PP2 (wt %) | 31.4 | | | | | |
| PP3 (wt %) | | 41.4 | | | | |
| PP4 (wt %) | | | 41.4 | | | |
| PP5 (wt %) | | | | 41.4 | | |
| PP6 (wt %) | | | | | 41.4 | |
| PP7 (wt %) | | | | | | 41.4 |
| Alpha-olefin (wt %) | 25 | 25 | 25 | 25 | 25 | 25 |
| Talc (wt %) | 0.5 | 0.5 | 0.5 | 0.5 | 0.5 | 0.5 |
| GF (wt %) | 25 | 25 | 25 | 25 | 25 | 25 |
| Coupling agent (wt %) | 2.5 | 2.5 | 2.5 | 2.5 | 2.5 | 2.5 |
| Tospearl (wt %) | 1 | 1 | 1 | 1 | 1 | 1 |
| Stabilizers (wt %) | 0.5 | 0.5 | 0.5 | 0.5 | 0.5 | 0.5 |
| PDMS master batch (wt %) | 1 | 1 | 1 | 1 | 1 | 1 |
| Slip agent (wt %) | 0.1 | 0.1 | 0.1 | 0.1 | 0.1 | 0.1 |
| Colorant (wt %) | 3 | 3 | 3 | 3 | 3 | 3 |
| Total (wt %) | 100 | 100 | 100 | 100 | 100 | 100 |
| Total rubber content (wt %) | 34.4 | 38.9 | 37.5 | 37.5 | 37.9 | 37.9 |

The mechanical and aesthetic properties were determined and are shown in Table.

TABLE 7

| | Examples | | | | | |
|---|---|---|---|---|---|---|
| | CE1 | CE2 | E3 | E4 | E5 | E6 |
| Ash content (%) | 27.4 | 27.0 | 27.0 | 27.8 | 26.9 | 26.4 |
| MFI ISO 1133 @ 230° C. | | | | | | |
| Melt flow index (g/10 min) | 7.4 | 7.0 | 9.5 | 15 | 8.7 | 12.5 |
| Melt volume index (cc/10 min) | 8.1 | 7.6 | 10.4 | 16.4 | 8.6 | 14.0 |
| Notched Izod impact at 23° C. | | | | | | |
| Izod impact (kJ/m$^2$) | 37.5 | 40.2 | 46.7 | 42.7 | 44.9 | 42.6 |
| Notched Izod impact at −20° C. | | | | | | |
| Izod impact (kJ/m$^2$) | 20.3 | 24.6 | 28 | 23.5 | 24 | 21.8 |
| VEM ISO 6603-B2 at −10° C. after 7 days | | | | | | |
| Energy at 90% Fmax (J) | 6.4 | 6.2 | 6.66 | 6.36 | 6.52 | 6.01 |
| Break Force (Fmax) (N) | 1983 | 1993 | 2100 | 1995 | 2089 | 2085 |
| Flexural modulus at 23° C. | | | | | | |
| Flexural modulus parallel (N/mm$^2$) | 1799 | 1259 | 1369 | 1459 | 1526 | 1650 |
| Flexural modulus, perpendicular (N/mm$^2$) | 965 | 740 | 723 | 781 | 817 | 959 |
| Tensile modulus at 23° C. | | | | | | |
| Tensile modulus (N/mm$^2$) | 2717 | 1943 | 2007 | 2182 | 2293 | 2435 |
| Tensile strength (N/mm$^2$) | 33 | 24.4 | 24 | 24 | 29 | 29 |
| Yield strength (N/mm$^2$) | 31.8 | 24.4 | 23.7 | 23.8 | 28.6 | 28.7 |
| Elongation at yield (%) | 7 | 6 | 6.1 | 4.8 | 7.9 | 6.4 |
| Elongation at break (%) | 9 | 8.2 | 9 | 7 | 11 | 9 |
| Stress at break (N/mm$^2$) | 29 | 21.6 | 17.8 | 20.3 | 24.1 | 24.5 |
| Warpage Measurements | | | | | | |
| Warpage after 24 h at 23° C. | 3.1 | 4.7 | 2.8 | 2.5 | 2.5 | 2.4 |
| Gloss values at 23° C. | | | | | | |
| 20° | 17 | 13 | 14 | 15 | 15 | 16 |
| 60° | 46 | 35.4 | 43 | 44 | 44 | 44 |
| 85° | 78 | 67 | 76 | 77 | 77 | 77 |
| Tiger-stripe performance | | | | | | |
| At 200° C., high injection speed, textured, fan gate | 7 | 6 | 8 | 7 | 7 | 7 |
| At 200° C., high injection speed, textured, pinpoint gate | 7 | 5 | 8 | 7 | 7 | 7 |
| At 230° C., high injection speed, textured, fan gate | 7 | 6 | 8 | 7 | 8 | 7 |
| At 230° C., high injection speed, textured, pinpoint gate | 7 | 5 | 8 | 7 | 7 | 7 |
| At 260° C., high injection speed, textured, fan gate | 8 | 5 | 7 | 6 | 7 | 7 |
| At 260° C., high injection speed, textured, pinpoint gate | 7 | 5 | 7 | 6 | 7 | 7 |
| Soft-touch performance | + | ++ | ++ | ++ | ++ | ++ |

Table shows that all of examples E3-E6 have higher melt flow index than the comparative example CE1, as a result of the higher melt flow of the heterophasic propylene copolymer (A) (PP4-PP7). This is even more pronounced for E4 and E6 with MFI values of 15 and 12.5 dg/min compared to MFI of 7.4 dg/min for CE1. The MFI of E3-E6 was higher than that of CE2.

Izod impact at 23° C. and −20° C. of examples E3-E6 is increased compared to comparative example CE1. E3 and E5 show an improvement in impact vs. CE1, resulting from higher total rubber content. The Izod impact of E3-E6 is similar to that of CE2.

Falling dart impact (VEM) at −10° C. is maintained at the same level or shows slight increase in E3-E6 compared to CE1 and CE2.

Flexural modulus in parallel and perpendicular directions of examples E3-E6 shows some decrease due to higher rubber fraction of the base resins (also referred to herein as heterophasic propylene copolymer (A)) used in the compounds (final compositions) when compared to CE1. The flexural modulus of E3-E6 generally shows some increase as compared to CE2.

Same conclusion as for flexural modulus can be drawn for tensile modulus.

Table also shows that increasing the total rubber content of the base resin and/or its melt flow index results in a decrease in warpage of the final composition, where CE1 shows higher warpage values as compared to those of E3-E6. CE2 shows a notably higher warpage value than those of E3-E6.

Results present in Table show a trend in slight decreased gloss levels of E3-E6 when compared to CE1. These excellent results are unexpected, as the increase in total rubber content commonly leads to higher gloss levels. The gloss of E3-E6 is higher than that of CE2.

Table shows that the tiger-stripe performance of E3-E6 is maintained at the level of CE1, although their total rubber content is increased. This is positively surprising result for injection molded article, as generally the higher total rubber content leads to worsened tiger-stripe performance. The tiger-stripe performance of E3-E6 is much better than that of CE2.

Although the haptic properties of the comparative sample CE1 was already very good (ranked +), by increasing the total rubber content the haptic properties of E3-E6 were even further improved (ranked ++). The haptic properties of CE2 were similar as those of E3-E6.

CONCLUSION

Comparing CE1 and CE2 to E3-E6, the compositions of the invention have a higher flow in combination with a good soft touch performance. Also, the results show that the compositions of the invention maintain properties and may even improve impact, warpage, tensile strength, gloss and/or tiger stripe performance, which makes the compositions of the invention suitable for (injection) molding applications as mentioned herein.

The invention claimed is:
1. A composition comprising:
a heterophasic propylene copolymer (A),
10 to 40 wt % glass fibers (B) based on the total weight of the composition, and
20 to 30 wt % an ethylene-octene copolymer (C) based on the total weight of the composition,
   wherein the heterophasic propylene copolymer (A) consists of
   (a) a propylene-based matrix,
   wherein the propylene-based matrix consists of a propylene homopolymer; and
   wherein the propylene-based matrix is present in an amount of 55 to 75 wt % based on the total heterophasic propylene copolymer, and
   (b) a dispersed ethylene-α-olefin copolymer,
   wherein the dispersed ethylene-α-olefin copolymer is present in an amount of 45 to 25 wt % based on the total heterophasic propylene copolymer, and
   wherein the sum of the total amount of propylene-based matrix and total amount of the dispersed ethylene-α-olefin copolymer in the heterophasic propylene copolymer is 100 wt % based on the heterophasic propylene copolymer,
wherein the heterophasic propylene copolymer (A) consists of one type of heterophasic propylene copolymer
wherein the heterophasic propylene copolymer has a flexural modulus of less than 1000 MPa as determined at 23° C. in the parallel direction according to ASTM D790 Procedure B on a sample of 65×12.7×3.2 mm,
wherein the dispersed ethylene α-olefin copolymer (b) has an average rubber particle size $d_{50}$ of 0.3 to 1.15 μm as determined by scanning electron microscopy, and
wherein a total rubber content in the composition is the sum of 1. (b) the dispersed ethylene-α-olefin copolymer in the heterophasic propylene copolymer (A) and 2. the ethylene-α octene copolymer (C) is 30 to 60 wt % based on the total weight of the composition.

2. The composition according to claim 1, wherein the composition has a melt flow index as determined according to ISO1133 at 230° C. and 2.16 kg in the range of 8.0 to 20.0 dg/min.

3. The composition according to claim 1,
wherein the composition has a melt flow index as determined according to ISO1133 at 230° C. and 2.16 kg in the range of 8.5 to 20 dg/min,
wherein the average rubber particle size of the dispersed ethylene α-olefin copolymer (b) as determined by scanning electron microscopy is at least 0.5 μm to 1.15 μm,
wherein (b) the dispersed ethylene-α-olefin copolymer is present in an amount of 28 to 40 wt % based on the heterophasic propylene copolymer (A), wherein the amount of ethylene in (b) the ethylene-α-olefin copolymer in the heterophasic propylene copolymer (A) is in the range of 40 to 55 wt %, based on (b) the ethylene-α-olefin copolymer in the heterophasic propylene copolymer (A).

4. The composition according to claim 1, wherein the heterophasic propylene copolymer (A) is made by
I) polymerizing monomers to obtain an intermediate heterophasic propylene copolymer having an intermediate melt flow index, and
II) visbreaking said intermediate heterophasic propylene copolymer, to obtain the final heterophasic propylene copolymer (A) having a melt flow index that is higher than the melt flow index of the intermediate heterophasic propylene copolymer.

5. The composition according to claim 4, wherein the final heterophasic propylene copolymer (A) has a melt flow index as determined according to ISO1133 at 230° C. and 2.16 kg in the range of 18 to 60 dg/min.

6. The composition according to claim 3, wherein the heterophasic propylene copolymer (A) is made by
I) polymerizing monomers to obtain an intermediate heterophasic propylene copolymer having an intermediate melt flow index, and
II) visbreaking said intermediate heterophasic propylene copolymer, during extrusion directly after step I), to obtain the final heterophasic propylene copolymer (A) having a melt flow index that is higher than the melt flow index of the intermediate heterophasic propylene copolymer,
wherein the final heterophasic propylene copolymer (A) has a melt flow index as determined according to ISO1133 at 230° C. and 2.16 kg in the range of 20 to 60 dg/min.

7. The composition according to claim 1, wherein (b) the dispersed ethylene-α-olefin copolymer is present in an amount of 28 to 35 wt % based on the heterophasic propylene copolymer (A).

8. The composition according to claim 1, and
wherein the amount of ethylene in (b) the ethylene-α-olefin copolymer in the heterophasic propylene copolymer (A) is in the range of 35 to 65 wt %, based on (b) the ethylene-α-olefin copolymer in the heterophasic propylene copolymer (A).

9. The composition according to claim 1, wherein the composition comprises 10 to 30 wt % of the glass fibers (B).

10. The composition according to claim 1, wherein the composition further comprises a silicone particle having the formula (I)

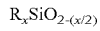  (I)

wherein x is a positive number greater than or equal to 1, and each R is independently an aliphatic hydrocarbon group, an aromatic hydrocarbon, or an unsaturated group.

11. A process for the preparation of the composition according to claim 1, comprising melt mixing (A), (B), (C) and optional components.

12. An article comprising the composition of claim 1.

13. The article according to claim 12, wherein the article is an injection moulded part.

14. A composition comprising:
a heterophasic propylene copolymer (A),
20 to 30 wt % glass fibers (B) based on the total weight of the composition, and
20 to 30 wt % an ethylene-octene copolymer (C) based on the total weight of the composition,
0.5 to 5 wt % of a silicone particle having the formula $R_xSiO_{2-(x/2)}$, wherein x is a positive number greater than or equal to 1, and each R is independently an aliphatic hydrocarbon group, an aromatic hydrocarbon, or an unsaturated group;
0.1 to 5 wt % of a modified polypropylene;
0.1 to 1 wt % of oleamide and/or erucamide;
0.2 to 5 wt % of a processing aide;
wherein the heterophasic propylene copolymer (A) consists of
(a) 55 to 75 wt % a propylene-based matrix, wherein the propylene-based matrix consists of a propylene homopolymer; and
(b) 25 to 45 wt % of a dispersed ethylene-α-olefin copolymer based on the heterophasic propylene copolymer (A), wherein the amount of ethylene in (b) the ethylene-α-olefin copolymer in the heterophasic propylene copolymer (A) is in the range of 35 to 65 wt %, based on (b) the ethylene-α-olefin copolymer in the heterophasic propylene copolymer (A),
and
wherein the sum of the total amount of propylene-based matrix and total amount of the dispersed ethylene-α-olefin copolymer in the heterophasic propylene copolymer is 100 wt % based on the heterophasic propylene copolymer,
wherein the heterophasic propylene copolymer (A) consists of one type of heterophasic propylene copolymer
wherein the heterophasic propylene copolymer has a flexural modulus of less than 1000 MPa as determined at 23° C. in the parallel direction according to ASTM D790 Procedure B on a sample of 65×12.7×3.2 mm,
wherein the dispersed ethylene α-olefin copolymer (b) has an average rubber particle size $d_{50}$ of 0.5 to 1.15 μm as determined by scanning electron microscopy, and
wherein a total rubber content in the composition is the sum of 1. (b) the dispersed ethylene-α-olefin copolymer in the heterophasic propylene copolymer (A) and 2. the ethylene-octene copolymer (C) is 30 to 60 wt % based on the total weight of the composition.

15. The composition of claim 1, wherein the dispersed ethylene α-olefin copolymer (b) has an average rubber particle size $d_{50}$ of 0.5 to 1.15 μm as determined by scanning electron microscopy.

* * * * *